(12) United States Patent
Eppley (10) Patent No.: US 8,753,126 B2
(45) Date of Patent: Jun. 17, 2014

(54) METHOD OF FORMING A TAXIDERMY MANNEQUIN

(71) Applicant: Ohio Taxidermy Supply, Inc., Millersburg, OH (US)

(72) Inventor: Bryan L. Eppley, Millersburg, OH (US)

(73) Assignee: Ohio Taxidermy Supply, Inc., Millersburg, OH (US)

( * ) Notice: Subject to any disclaimer, the term of this patent is extended or adjusted under 35 U.S.C. 154(b) by 0 days.

(21) Appl. No.: 13/860,866

(22) Filed: Apr. 11, 2013

(65) Prior Publication Data
US 2013/0230839 A1 Sep. 5, 2013

Related U.S. Application Data

(62) Division of application No. 12/581,216, filed on Oct. 19, 2009, now Pat. No. 8,430,673.

(51) Int. Cl.
*G09B 23/00* (2006.01)

(52) U.S. Cl.
USPC ......................................................... 434/295

(58) Field of Classification Search
USPC ......... 434/295, 296; 43/2; 446/300, 337–339, 446/384, 391
See application file for complete search history.

(56) References Cited

U.S. PATENT DOCUMENTS

| | | | |
|---|---|---|---|
| 2,831,271 A | 4/1958 | Stitt | |
| 3,994,077 A | 11/1976 | Touchstone | |
| 4,145,006 A | 3/1979 | Webb | |
| 5,733,130 A | 3/1998 | Eppley | |
| 5,980,260 A | 11/1999 | Caputi | |
| 5,983,552 A | 11/1999 | Nelson | |
| 6,447,359 B1 | 9/2002 | Crump | |
| 6,458,434 B1 | 10/2002 | Coombs, Jr. | |
| 6,537,131 B1 | 3/2003 | Larian | |
| 6,623,814 B2 | 9/2003 | Harness | |
| 6,629,872 B2 * | 10/2003 | Cheung | 446/385 |
| 6,799,974 B2 | 10/2004 | Martin et al. | |
| 6,884,080 B2 | 4/2005 | Thompson | |
| 6,901,693 B1 | 6/2005 | Crowe | |
| 7,827,728 B1 | 11/2010 | Spafford et al. | |
| 8,162,670 B2 | 4/2012 | Hacke | |
| 2002/0162268 A1 | 11/2002 | Fulcher | |
| 2007/0190510 A1 | 8/2007 | Johnson | |

* cited by examiner

*Primary Examiner* — Kurt Fernstrom
(74) *Attorney, Agent, or Firm* — Sand & Sebolt (57) ABSTRACT

The present invention is a taxidermy mannequin having a mounting portion generally in the shape of an animal body, and a display portion generally in the shape of an animal head, wherein the mounting portion and display portion are secured together through a universal connection, thereby the taxidermist may choose different display portions to secure to the mount portion. The present invention further includes a plurality of selectively interchangeable features which are secured to the display portion. The features include a nose, a jaw, an eye, an ear liner, and a nictitating membrane.

10 Claims, 10 Drawing Sheets

METHOD OF FORMING A TAXIDERMY MANNEQUIN

CROSS REFERENCE TO RELATED APPLICATION

This application is a divisional of U.S. patent application Ser. No. 12/581,216, filed Oct. 19, 2009; the disclosure of which is incorporated herein by reference.

BACKGROUND OF THE INVENTION

1. Technical Field

The invention relates generally to a taxidermy mannequin. More particularly, the invention relates to a modular taxidermy mannequin. Specifically, the invention relates to a modular taxidermy mannequin with separable ears, eyes, nose, jaw, and nictitating membrane, which further provides a universal mount system whereby the head may be connected to different body bases having particular animal poses.

2. Background Information

Taxidermy is the act of mounting or reproducing dead animals for display (e.g. as hunting trophies) or for sources of study. Taxidermy can be done on all species of animals including mammals, birds, nematodes, reptiles, and amphibians. The methods that taxidermists practice have been improved over the last century, heightening taxidermic quality, and lowering toxicity. The animal is first skinned in a process similar to removing the skin from a chicken prior to cooking. This can be accomplished without opening the body cavity so the taxidermist usually does not see internal organs or blood. The skin is tanned and repaired and then placed on a mannequin for assembling the mount. Mannequins are commercially available from a number of suppliers.

Generally, the taxidermist sews and glues the animal skin to a mannequin so as to replicate a realistic body pose and shape of the animal. Typical taxidermy mannequins include an integrated body and head, with sockets for eyes. However, visible body parts which are not retained with the skin are replaced by artificial means, such as the teeth and eyes. In a modern deer head mount, for example, the only natural parts of the animal used are the antlers and the skin. All of the other organs and tissues are recreated with man-made materials. The eyes are made from glass, the eyelids are sculpted from clay, the soft tissues of the nose and mouth are sculpted from epoxy or wax, and the mannequin is made from polyurethane foam. Clay and glue are used to secure these items to the mannequin head. Ear liners are produced to replace the ear cartilage and slide into the ear sheath created by removing the cartilage. The protruding end of the ear liners are typically attached to the head by clay and glue.

Taxidermists spend an enormous amount of time cutting, applying clay, and gluing features to the mannequin to achieve a realistic animal look. Over time, clay and glue lose their shape and adherence to the mannequin and the overall realistic look of the mounted animal deteriorates. Furthermore, animal mannequins are provided having an integral body, head, and facial features. If the animal's characteristics don't precisely meet the corresponding model characteristics of the mannequin, the taxidermist must either shave down features, or build them up through the use of clay and glue. This adds to the time required to create a realistic looking animal and prevents all but the most skilled artists to excel at the art.

Thus, there is a need in the art for a modular taxidermy mannequin which incorporates separable animal features and provides an attachment mechanism for affixing the features securely to the mannequin.

BRIEF SUMMARY OF THE INVENTION

The present invention is a taxidermy mannequin comprising a display portion adapted to support a portion of an animal skin, wherein the display portion includes a plurality of removable features, such as a jaw, nose, eye, ear liner, and nictitating membrane; an at least one mounting portion adapted to support another portion of the animal skin; and a universal connector by which the display portion is mountable on the at least one mounting portion. The taxidermy mannequin of the present invention may further include more than one mounting portion, wherein each mounting portion is formed having a particular body orientation, and the display portion may be mounted upon a selected mounting portion through the universal connector,

BRIEF DESCRIPTION OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

Similar numbers refer to similar parts throughout the drawings.

DETAILED DESCRIPTION OF THE INVENTION

Referring to FIGS. 1-12, there is shown a modular taxidermy mannequin in accordance with the present invention and generally indicated at 10. Shown particularly in FIGS. 2 and 3, mannequin 10 is in the form of a mounting portion 12 and a display portion 18.

Figure 1:
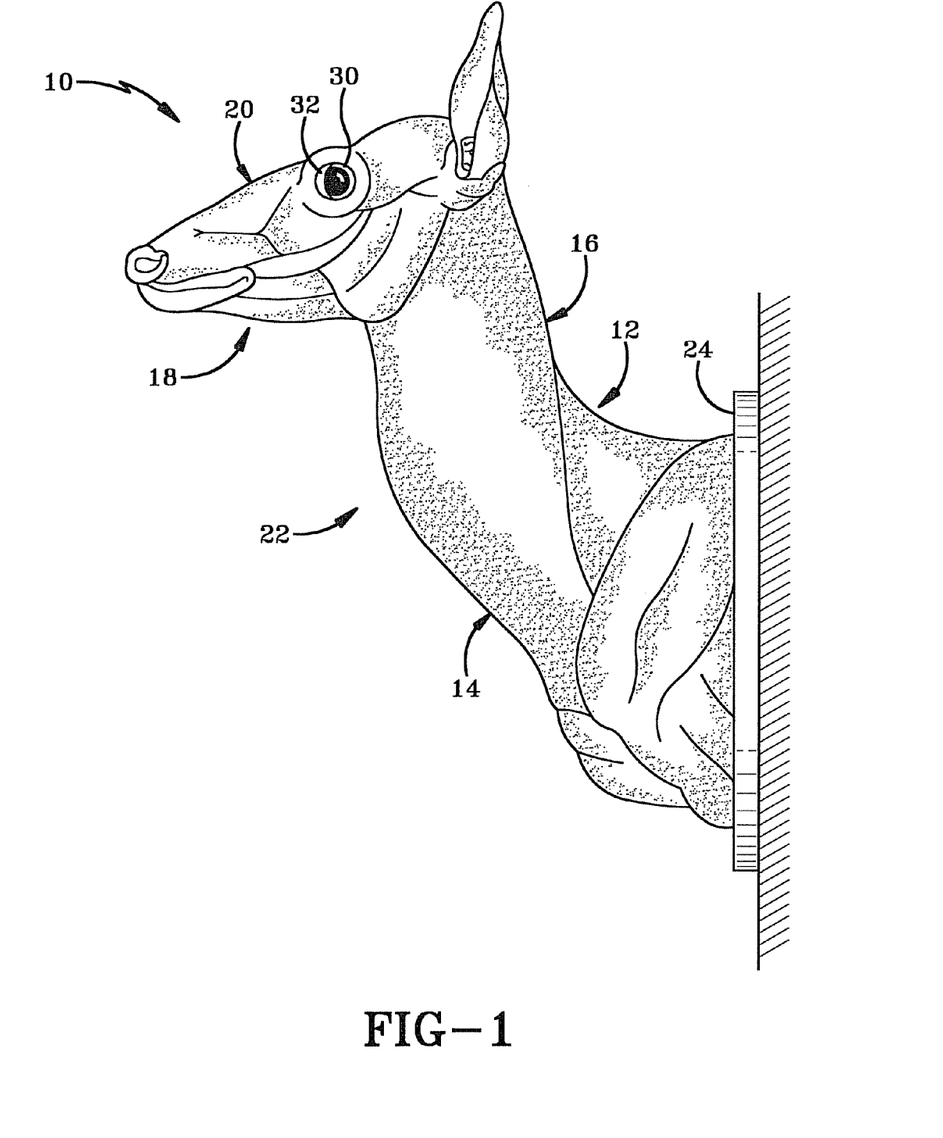
FIG. 1 is a side view of a modular taxidermy mannequin of the present invention with a display portion engaged with a mounting portion having an orientation and mounted to a support structure.
Figure 2:
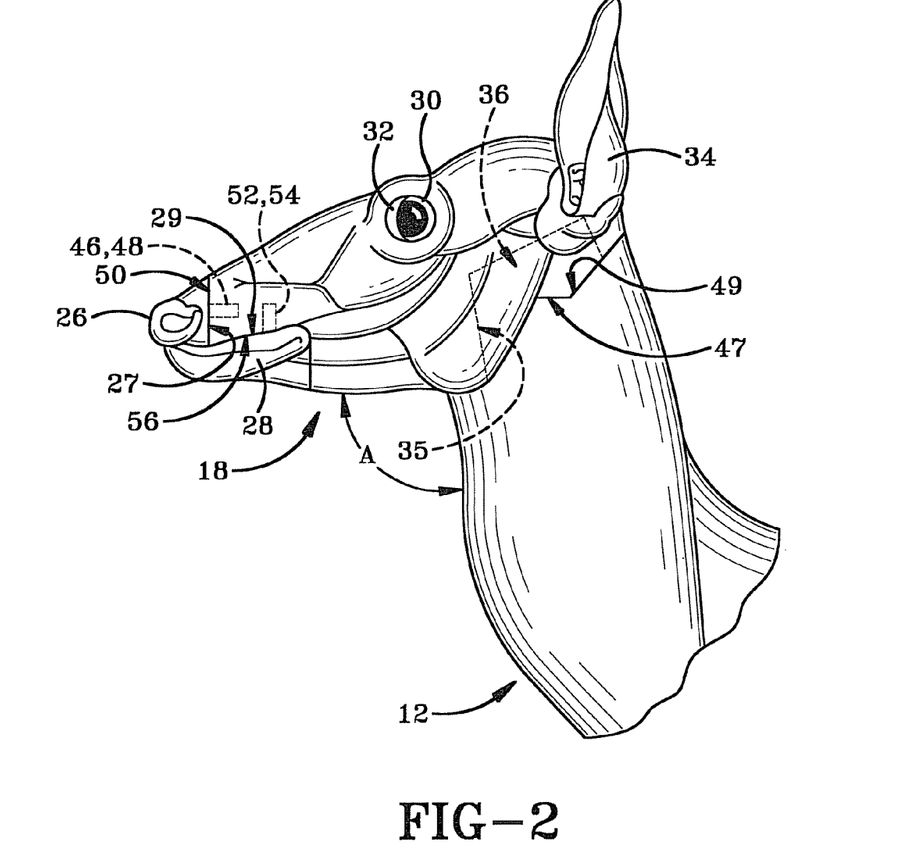
FIG. 2 is a side view of the modular taxidermy mannequin.
Figure 3:
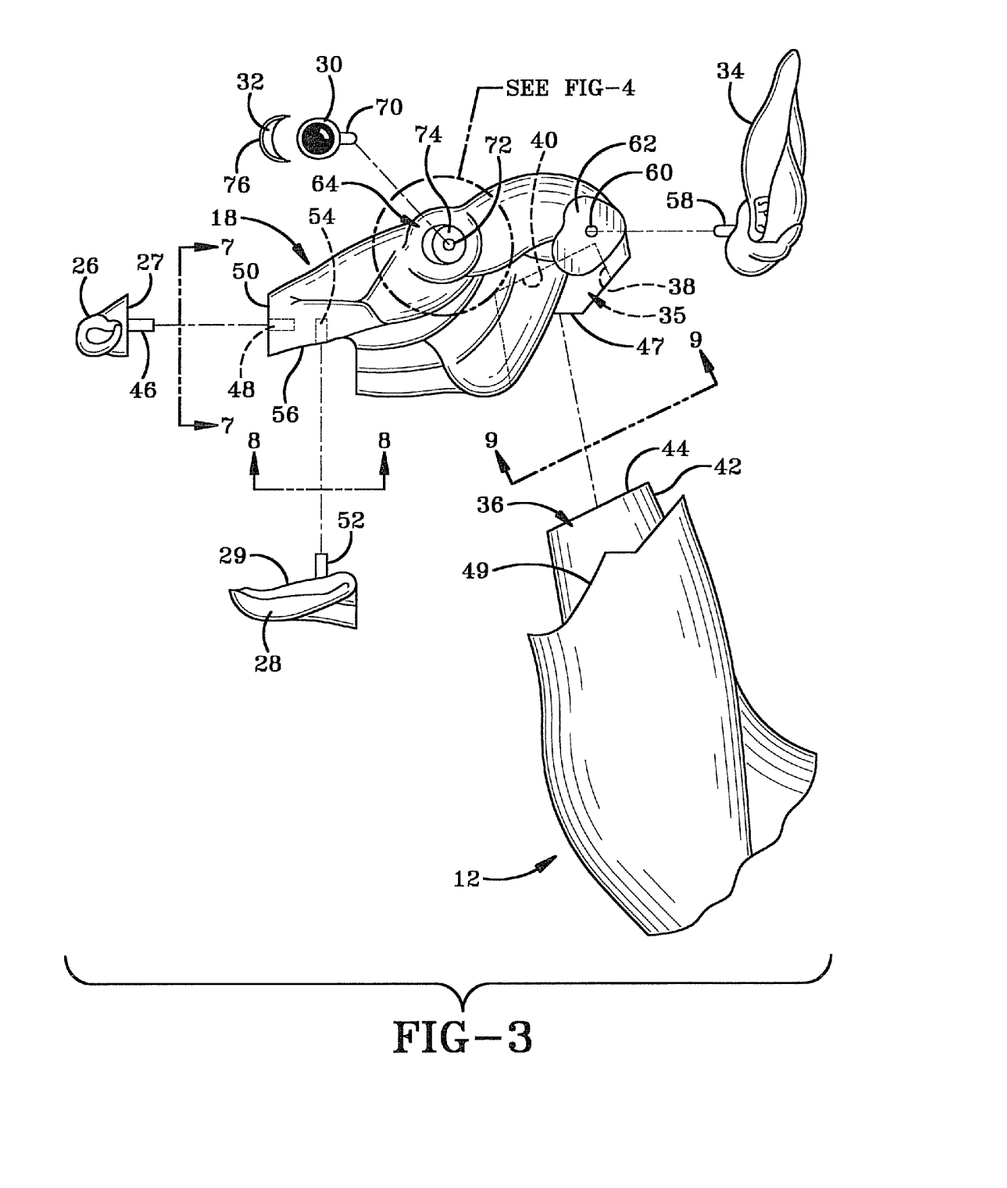
FIG. 3 is a side exploded view of the modular taxidermy mannequin.
Figure 4:
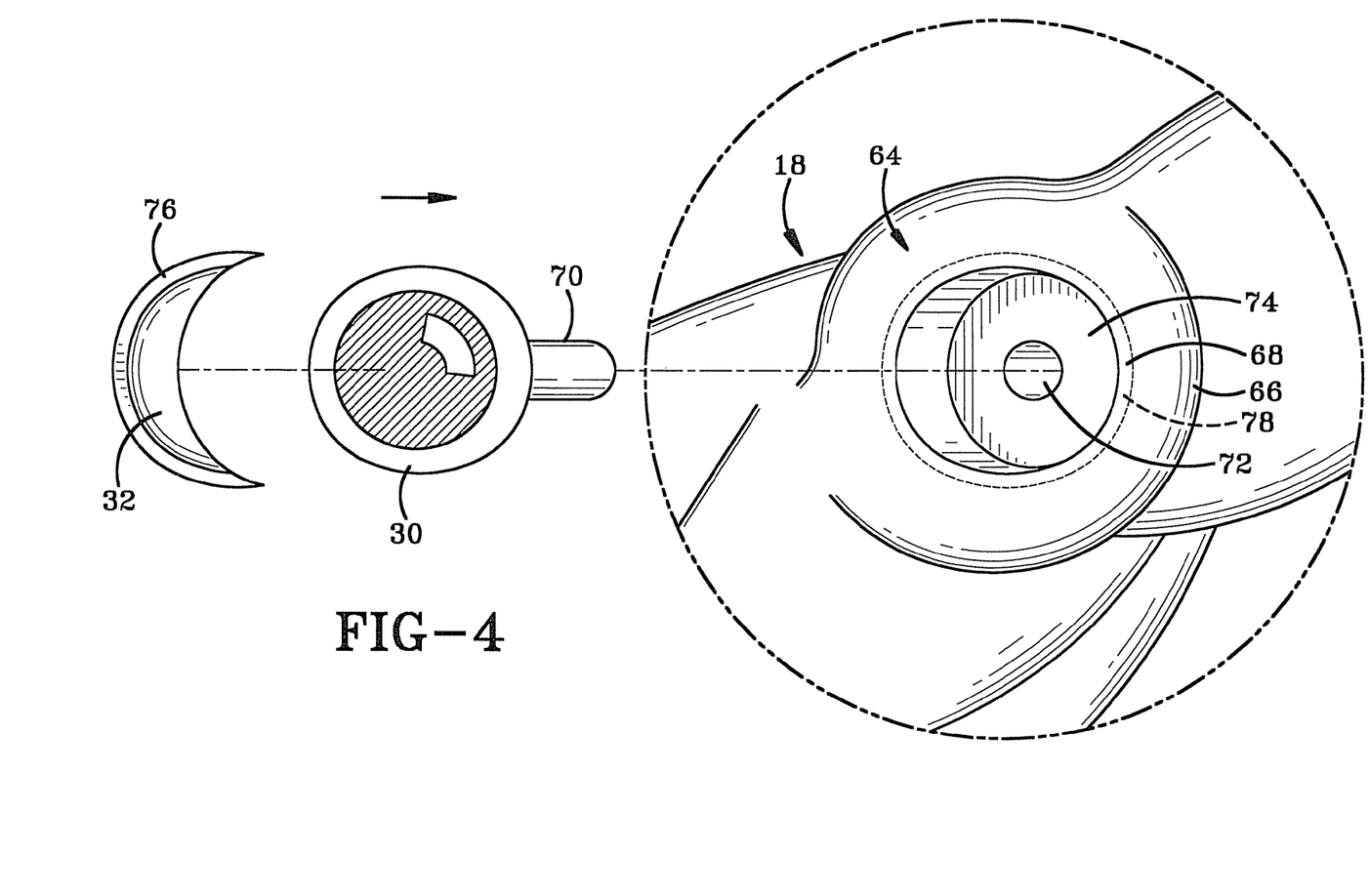
FIG. 4 is a magnified exploded view of an eye assembly of FIG. 3.
Figure 5:
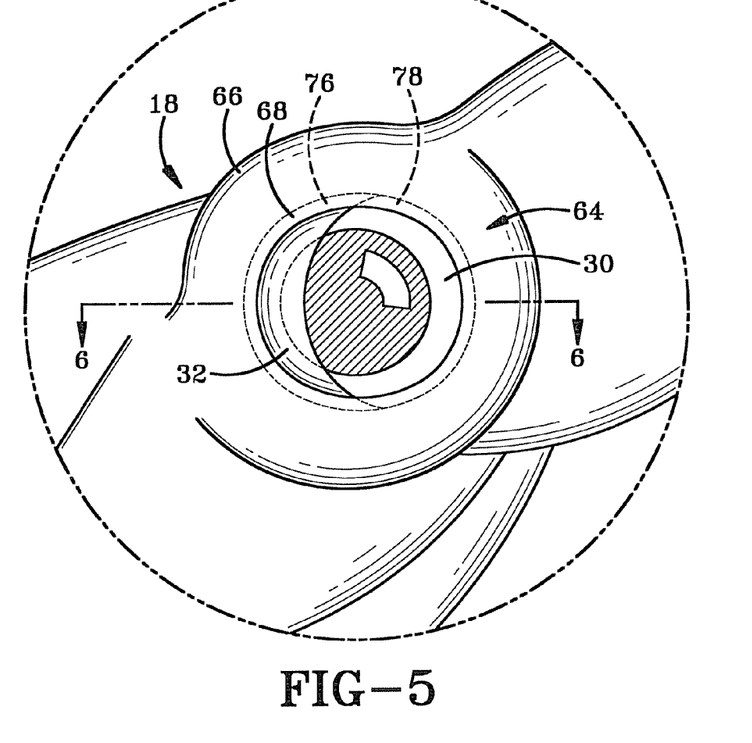
FIG. 5 is a magnified assembled view of the eye assembly of FIG. 4.
Figure 6:
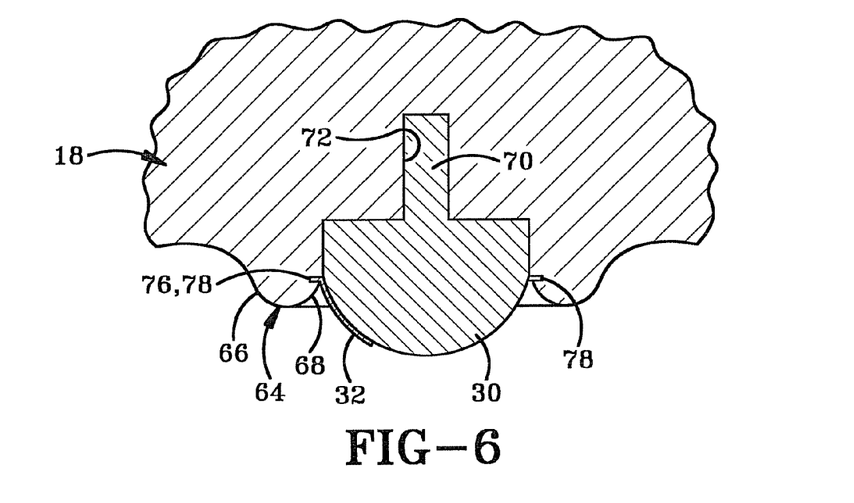
FIG. 6 is a view taken along line 6-6 of FIG. 5.

As shown in FIGS. 1-3, mounting portion 12 is formed in the shape of an animal body posed in an orientation 22. Mounting portion 12 is adapted to support a first portion 14 of an animal skin 16 and adapted to be mounted onto a support structure 24. Shown particularly in FIG. 3, mounting portion 12 includes an insert sidewall 42 extending to terminate at an insert top wall 44, wherein sidewall 42 and top wall 44 form an insert boss 36. Mounting portion 12 further includes a non-linear neck surface 49 located proximate insert boss 36.

As shown in FIGS. 1-3, display portion 18 is formed in the shape of an animal head and adapted to support a second portion 20 of animal skin 16. Shown particularly in FIG. 3, display portion 18 includes recess sidewalls 38 and a recess top wall 40 which combine to define a recess 35. Display portion 18 further includes a non-linear head surface 47 proximate recess 35, and a plurality of simulated features.

As shown in FIG. 3, display portion 18 further includes a plurality of simulated features. The plurality of simulated features includes a simulated nose 26, a simulated jaw 28, a simulated eyeball 30, a simulated nictitating membrane 32, and an ear liner 34. Nose 26 includes a nose dowel pin 46 sized to be fittably received in a nose dowel hole 48 defined by display portion 18. Nose 26 abuts a nose engaging surface 50 (FIG. 7) with surface 27 when nose dowel pin 46 is fully inserted and engaged with nose dowel hole 48. Jaw 28 includes a jaw dowel pin 52 sized to be fittably received in a jaw dowel hole 54 defined by display portion 18. Jaw 28 abuts a jaw engaging surface 56 (FIG. 8) with surface 29 when jaw dowel pin 52 is fully inserted and engaged with jaw dowel hole 54. Ear liner 34 includes an ear dowel pin 58 sized to be fittably received in an ear dowel hole 60 defined by display portion 18. Ear liner 34 abuts an ear engaging surface 62 (FIG. 9) when ear dowel pin 58 is fully inserted and engaged with ear dowel hole 60.

As shown in FIGS. 3-6, display portion 18 further includes an eye socket 64 in a generally circular shape (FIG. 5) having an outer surface 66 and an inner surface 68. Simulated eyeball 30 includes an eye dowel pin 70 sized to be fittably received in an eye dowel hole 72 defined by display portion 18. Simulated eyeball 30 abuts an eye engaging surface 74 when eye dowel pin 70 is fully inserted and engaged with eye dowel hole 72. Simulated nictitating membrane 32 includes a lip 76 complementarily sized and formed to fit into a groove 78 defined by inner surface 68 of eye socket 64. Groove 78 is formed continuously around the entire internal circumference of eye socket 64 and inner surface 68.

Figure 10:
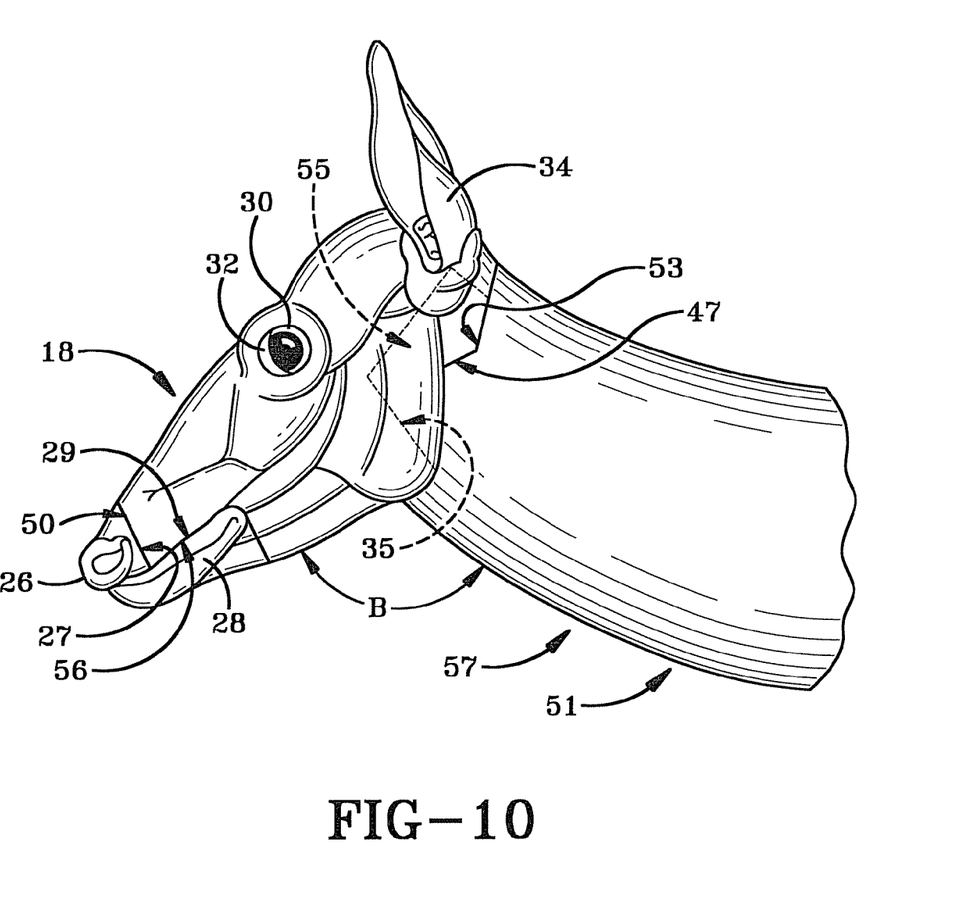
FIG. 10 is a side view of the modular taxidermy mannequin having a second mounting portion with a second orientation.

As shown in FIG. 10, a second mounting portion 51 is formed in the shape of an animal body and adapted to support first portion 14 of animal skin 16, and further adapted to be mounted onto support structure 24. Second mounting portion 51 includes a non-linear neck surface 53 and an insert boss 55. Second mounting portion 51 is formed having an orientation 57.

Figure 11:
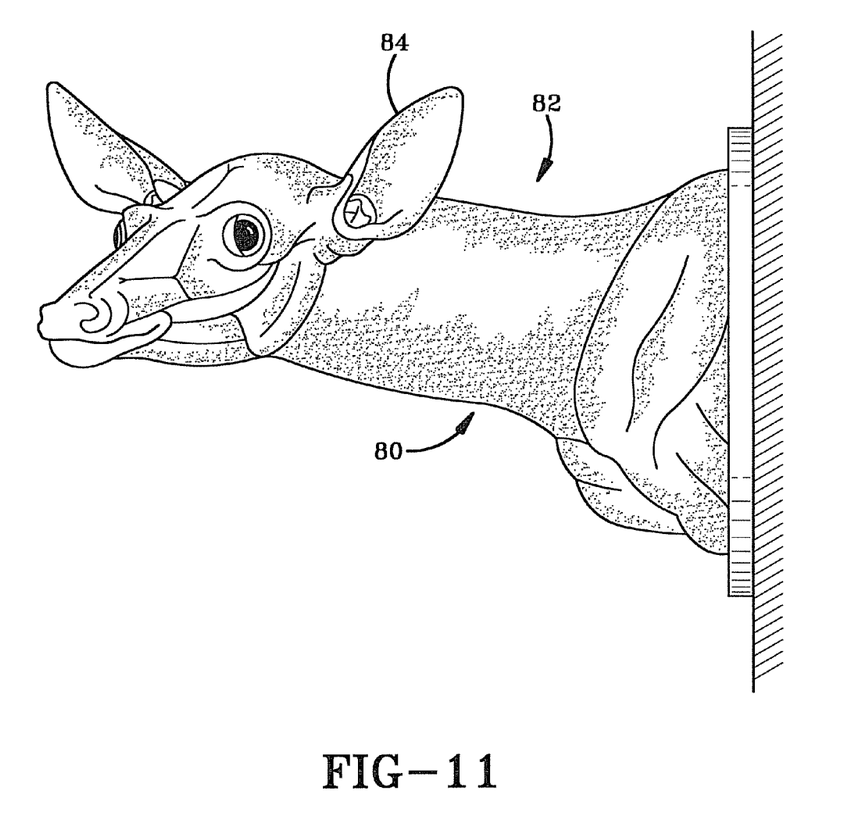
FIG. 11 is a perspective view of the modular taxidermy mannequin having a third mounting portion with a third orientation and mounted to the support structure.
Figure 12:
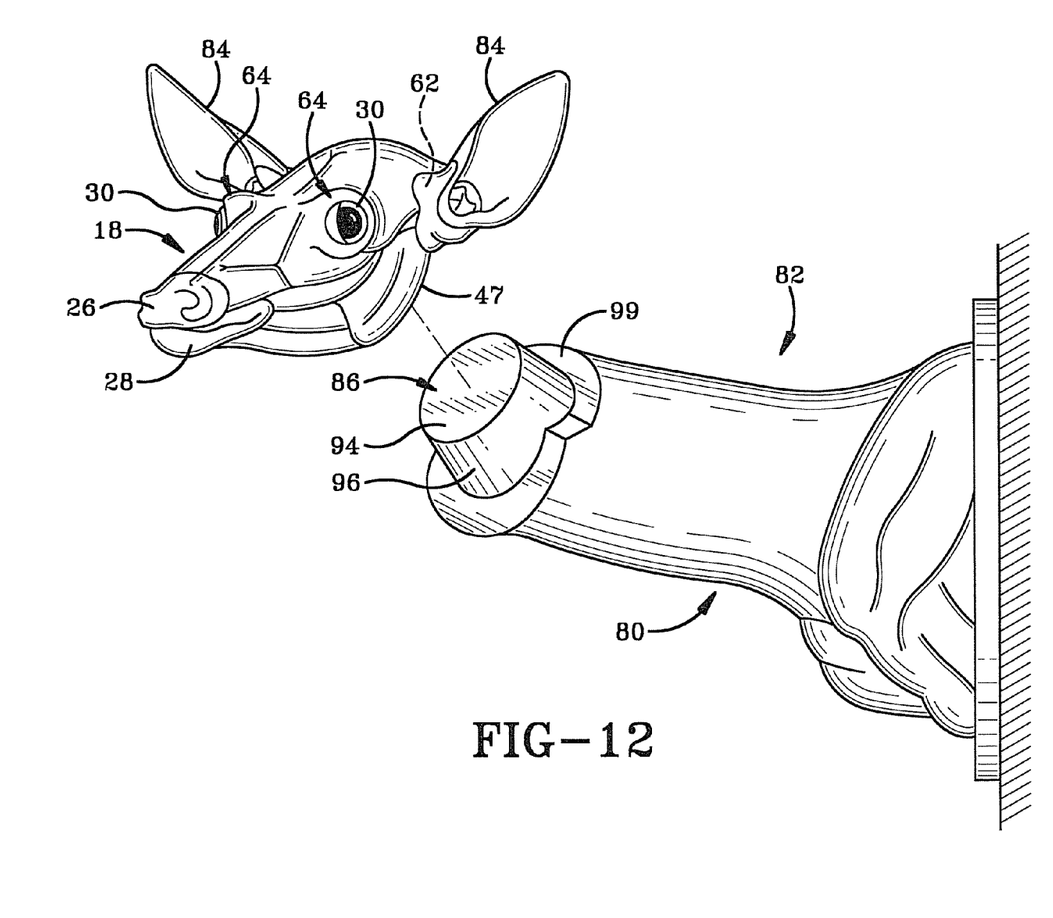
FIG. 12 is a perspective view of the modular taxidermy mannequin of FIG. 11 with the third display portion exploded.

As shown in FIGS. 11 and 12, a third mounting portion 80 is formed in a shape of the animal body and adapted to support first portion 14 of animal skin 16 and adapted to be mounted onto support structure 24. Mounting portion 80 is formed having an orientation 82 which positions the animal body in a different pose with respect to orientations 22 and 57. Shown particularly in FIG. 12, third mount portion 80 includes an insert sidewall 96 extending to terminate at an insert top wall 94, wherein sidewall 96 and top wall 94 form an insert boss 86. Third mounting portion 80 further includes a non-linear neck surface 99, located proximate insert boss 86.

In operation, the taxidermist skins the animal using methods which are commonly known in the art, retaining animal skin 16 and discarding the unwanted parts. Typically the soft tissues, such as the eyes, nose, lips, and ear cartilage are discarded as being unusable for taxidermic purposes. However, in order to create a realistic looking animal, the soft tissues must be replaced and have animal skin 16 affixed thereto. Furthermore, it is desirable that animal skin 16 be maintained in a solid piece for displaying on the taxidermy mannequin because any cuts or breaks in animal skin 16 detracts from the aesthetic qualities of the finished animal model.

To begin the mounting process, the taxidermist selects display portion 18. This selection is based on the size requirement of first portion 14 of the particular animal skin 16. The taxidermist then selects features such as nose 26, jaw 28, nictitating membrane 32, eyeball 30, and ear liner 34. These selections are made for first portion 20 of the particular animal skin 16 and based on sizing and positioning requirements of the particular features.

The taxidermist may work with the features before they are affixed to display portion 18. This allows the taxidermist to pivot and move the features and more easily to work with animal skin 16 without having display portion 18 moving in conjunction with the features. Coloring, painting, gluing, and applying clay may all be done to the features before they are affixed to display portion 18, giving the taxidermist a wider range of freedom to work with the features and display portion 18 to achieve a more realistic look to the final product, while decreasing the time involved.

When the taxidermist is satisfied with the features, they are affixed to display portion 18. As shown in FIG. 3, the affixation is done using the same general method for each feature, using dowel pins 46, 52, 58, and 70, inserted into dowel holes 48, 54, 60, and 72, respectively. The particular method for each feature is described hereafter.

Figure 7:
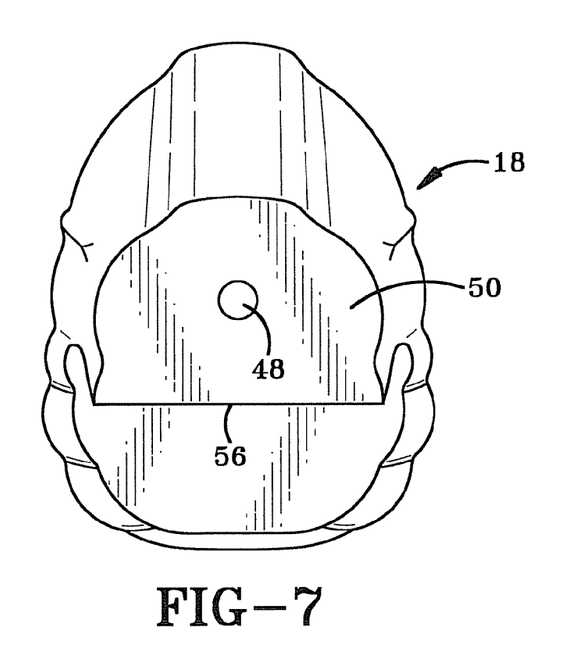
FIG. 7 is a view taken along line 7-7 of FIG. 3.
Figure 8:
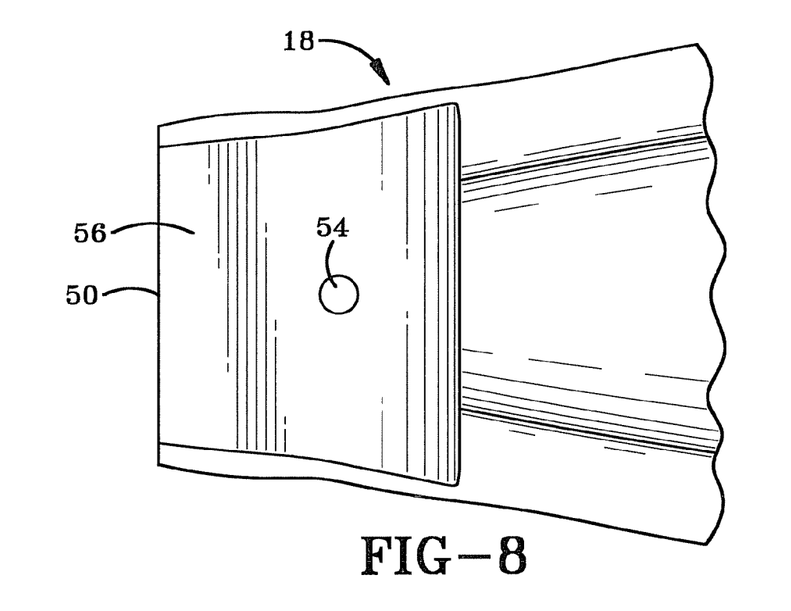
FIG. 8 is a view taken along line 8-8 of FIG. 3.

As shown in FIGS. 2, 3, 7, and 8, jaw 28 includes jaw dowel pin 52 extending from surface 29. Display portion 18 defines a complementarily sized jaw dowel hole 54 extending inwardly from jaw engaging surface 56 (FIG. 8). Jaw 28 is affixed to display portion 18 by inserting dowel pin 52 into dowel hole 54 and pressing jaw 28 until surface 29 abuts jaw engaging surface 56 on display portion 18, thereby dowel pin 52 is fully inserted into dowel hole 54. Jaw 28 is frictionally held to display portion 18 by way of the sliding engagement between jaw dowel pin 52 and jaw dowel hole 54. Surface 29 on jaw 28 and jaw engaging surface 56 on display portion 18 are contoured to follow the natural upper lip portion of the animal. Surface 56 is shaped to complementarily abut a portion of surface 29 when dowel pin 52 is fully inserted into dowel hole 54. As shown in FIG. 2, the remaining portion of surface 29 which does not abut surface 56 extends outwardly from display portion 18 and creates a shelf to fittably and complementarily abut a portion of nose 26.

As shown in FIGS. 2, 3, and 7, nose 26 includes nose dowel pin 46 extending from surface 27. Display portion 18 defines a complementarily sized nose dowel hole 48 extending inwardly from nose engaging surface 50 (FIG. 7). Nose 26 is affixed to display portion 18 by inserting dowel pin 46 into dowel hole 48 and pressing nose 26 until surface 27 abuts nose engaging surface 50 on display portion 18, thereby dowel pin 46 is fully inserted into dowel hole 48. Nose 26 is frictionally held to display portion 18 by way of the sliding engagement between nose dowel pin 46 and nose dowel hole 48. Surface 27 on nose 26 and nose engaging surface 50 on display portion 18 are generally flat surfaces formed to complementarily abut when dowel pin 46 is fully inserted into dowel hole 48. As shown in FIG. 2, a portion of surface 29 of jaw 28 complementarily abuts a portion of nose 26. This forms a tight fit between jaw 28, nose 26, and display portion 18, and provides a smooth outer surface to secure second portion 20 of animal skin 16.

Figure 9:
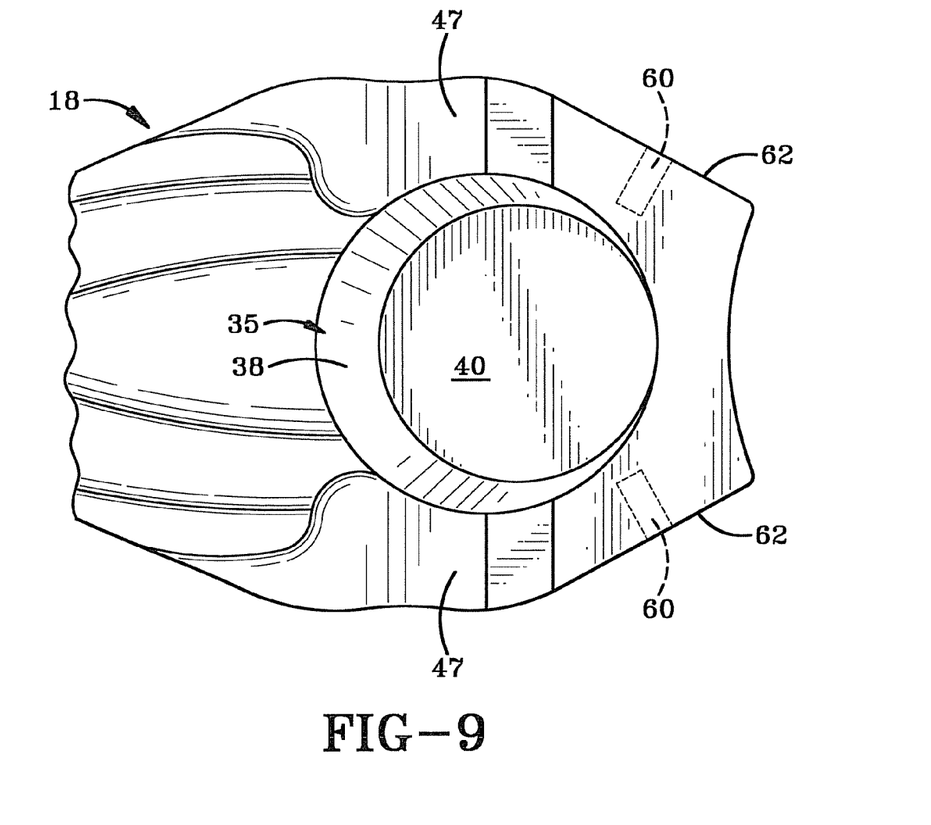
FIG. 9 is a view taken along line 9-9 of FIG. 3.

Ear liner 34 is affixed using a method similar to the method employed with nose 26 and jaw 28. As shown in FIGS. 2, 3, and 9, ear liner 34 includes ear dowel pin 58 and display portion 18 defines a complementarily sized ear dowel hole 60 extending inwardly from ear engaging surface 62 (FIG. 9). Ear liner 34 is affixed to display portion 18 by inserting dowel pin 58 into dowel hole 60 and pressing until ear liner 34 abuts ear engaging surface 62 on display portion 18, thereby dowel pin 58 is fully inserted into dowel hole 60. Similar to nose 26 and jaw 28, ear liner 34 is frictionally held to display portion 18 by way of the sliding engagement between ear dowel pin 58 and ear dowel hole 60.

As shown in FIGS. 3-6, simulated eyeball 30 is affixed to display portion 18 using a method similar to the method employed with nose 26, jaw 28, and ear liner 34. Eyeball 30 is partially covered by simulated nictitating membrane 32, which is affixed to display portion 18 after eyeball 30 is affixed to display portion 18. Membrane 32 contains lip 76 which engages groove 78 defined by inner surface 68 of eye socket 64. Groove 78 extends around the entire inner circumference of eye socket 64. Membrane 32 is unique in the art in that it may be affixed to inner surface 68 in any position desired by the taxidermist with respect to groove 78. Membrane 32 may then be rotated to the correct anatomical position for final display of the animal model. The taxidermist may insert membrane 32 at any stage in the taxidermy process, and at any orientation relative to groove 78. The taxidermist may insert membrane 32 at a non-anatomically correct position in order to more easily work on a particular part of the eye area, then later move membrane 32 into the anatomically correct position. The membrane connection between membrane 32 and eye socket 64 is shown as lip 76 slidingly engaged with groove 78. However, this membrane connection may be of any style having similar properties, including a mating fashion, a press fit, a snap fit, or a frictional sliding engagement. Furthermore, glue or other adhesive material may be used to enhance or hold the engagement of membrane 32 and groove 78.

Jaw 28, eyeball 30, and ear liner 34 are all secured to display portion 18 by the same general method. However, it is not a requirement of the present invention that they be secured by the same method, nor is it a requirement of the present invention that the dowel pin and dowel hole method be used. Any method for affixing a feature to display portion 18 may be used, and may include a mating fashion, a press fit, or a snap fit. For example, a male snap fit portion may be positioned on nose 26, and the female snap fit portion may be located on display portion 18. It is also envisioned that the features themselves may include the dowel holes, such as nose 26 including dowel hole 48 and engaging surface 50, and the display portion 18 may include dowel pin 46 (not shown). Furthermore, glue or other adhesive material may be used to enhance or hold the engagement of the features and display portion 18.

One of the primary features of the present invention is the taxidermist may choose differently sized and oriented features for the animal to more closely fit second portion 20 of skin 16. This reduces folds or lumps in skin 16 which increases the aesthetic value of the final product. Furthermore, the changeable nature of the features gives the taxidermist the ability to configure the animal model with different poses, while using the same display portion 18. This dramatically reduces the amount of stock a taxidermist must keep on hand, and simplifies the process of building the animal model. Rather than stocking a full sized, non-modular taxidermy mannequin for every size animal skin and for every permutation of desired features, the taxidermist may simply stock display portions 18 and selected orientations of features to affix to display portion 18 to build the desired mannequin.

The changeable nature of the features can be seen in FIGS. 1 and 2, when compared to FIGS. 11 and 12. As shown in FIGS. 1 and 2, ear liner 34 has a particular position and direction. As shown in FIGS. 11 and 12, ear liner 84 has a different position and direction, with respect to ear liner 34. As with all the plurality of features, ear liner 34 and 84 may alternately be used to position the animal ears as desired by the taxidermist, and to more accurately depict a live animal. The "upright" forward pose of orientation 22 shown in FIGS. 1 and 2 would typically include the animal's ears standing up and pointed forward. To achieve this look, the taxidermist would select ear liner 34. The "peek" pose of orientation 82 shown in FIGS. 11 and 12 would typically include the animal's ears partially lowered and pivoted outwardly. To achieve this look, the taxidermist would select ear liner 84.

Likewise, multiple noses 26, jaws 28, and eyeballs 30, may be formed having different sizes, directions, and overall look to change the overall look of modular taxidermy mannequin 10. For example, nose 26 may be formed having flared nostrils and jaw 28 may have an opened mouth or differently shaped lips. These features are much smaller in relation to the overall size of mannequin 10, such that a taxidermist may keep several versions of each feature in stock, requiring minimal storage space. This is a great improvement in the art, where currently a taxidermist must stock multiple versions of an entire integrated taxidermy mannequin to provide the ability to select the look of the model. The integrated taxidermy mannequin is much larger than the individual features, and therefore much more space is required to store an equal amount of selections in modular features. Furthermore, the taxidermist cannot achieve such a finely tuned level of control over the size of the individual features when the taxidermist must select from a "one size fits all" integrated mannequin.

After the desired features are selected and affixed to display member 18, first portion of skin 14 is secured to display portion 18 using the methods common in the art. However, this task is simplified by modular taxidermy mannequin 10 in that display portion 18 is separated from mounting portion 12. One of the primary features of the present invention is the ability of display portion 18 to separate from mounting portion 12. This allows the taxidermist to pivot and move display portion 18 and more easily work with animal skin 16 without having mounting portion 12 moving in conjunction with display portion 18 and hampering the taxidermist. By separating display portion 18 and mounting portion 12, only the section with which the taxidermist is working on need be present at that time. This also allows the taxidermist to handle only display portion 18 while working on the features and the head portion of modular taxidermy mannequin 10. The area where a head and body are typically permanently connected in previous taxidermy mannequins is available to the taxidermist for handling and controlling display portion 18. Instead of holding the neck portion of previous taxidermy mannequins or placing the entire mannequin on a table, the present invention allows the taxidermist to hold display portion 18 using any hand placement to support display portion 18. This allows the taxidermist to adjust only display portion 18 when needed for taxidermy purposes.

When the taxidermist is satisfied that first portion of skin 14 is properly secured onto display portion 18 and the associated features, display portion 18 is then affixed to mounting portion 12. As shown in FIGS. 2 and 3, mounting portion 12 includes insert boss 36 which is formed to be complementarily received in recess 35 defined by display portion 18. Once insert boss 36 is inserted into recess 35, display portion 18 is frictionally held to mounting portion 12 by way of the sliding engagement between insert boss 36 and recess 35. Recess sidewalls 38 of recess 35 frictionally abut insert sidewall 42 of insert boss 36. Likewise, recess top wall 40 of recess 35 frictionally abuts insert top wall 44 of insert boss 36.

One of the primary features of the present invention is the universal connection provided by recess 35 and head surface 47 of display portion 18. Recess 35 and head surface 47 are formed having a standardized shape and size, which allows any number of differently positioned mounting portions to be affixed thereto, as long as these mounting portions include a protruding area which is sized and shaped to be fittably received in recess 35, and a neck surface sized to complementarily abut head surface 47. An insert conforming to the general nature of a proper insert for recess 35 is shown in FIG. 3 as insert boss 36, FIG. 10 as insert boss 55, and FIG. 12 as insert boss 86. A neck area conforming to the general nature of a proper neck area for head surface 47 is shown in FIG. 3 as neck surface 49, FIG. 10 as neck surface 53, and FIG. 12 as neck surface 99. This universal connection allows the taxidermist to affix display portion 18 to different mounting portions having different orientations and positions of the animal's body and head while using the same display portion 18.

As shown in FIGS. 3 and 9, recess 35 is defined by display portion 18 as a generally frustoconical shaped void, extending into display portion 18 at a location where the neck of the animal would typically meet the head of the animal. As shown in FIG. 9, the depth of recess 35 is determined and shaped by recess sidewall 38, creating a smooth inner surface with which insert boss 36 may slidably abut and be frictionally held thereto. Recess top wall 40 is generally a smooth surface which creates a stopping barrier to insert boss 36 and prevents further inward movement. The smooth nature of sidewall 38 and top wall 40 allow for a sliding abutment with insert boss 36, however, the frustoconical shape of recess 35 cannot prevent display portion 18 from rotating about insert boss 36 when display portion 18 and mounting portion 12 are engaged. Therefore, non-linear head surface 47 is provided to restrict rotational movement of display portion 18 on mounting portion 12. As shown in FIG. 3, when insert boss 36 is fully inserted into recess 35, non-linear head surface 47 of display portion 18 fittably abuts complementarily shaped non-linear neck surface 49 of mounting portion 12. Head surface 47 and neck surface 49 fit together in a locking fashion to secure display portion 18 in a desired position relative mounting portion 12. As shown in FIGS. 2 and 3, a portion of the connection between display portion 18 and mounting portion 12 formed at head surface 47 and neck surface 49 is generally positioned along the jawline of the animal head to provide a smooth surface for securing second portion 20 of animal skin 16.

As shown in FIGS. 2 and 10, neck surface 49 may be formed to position display portion 18 in any desired direction, elevation, and angle simply by forming insert boss 36 and neck surface 49 on mounting portion 12 and 51 to support display portion 18 at the desired angle. As shown in FIG. 2, display portion 18 is positioned at an angle "A" from first mounting portion 12. This gives display portion 18 a particular head tilt position associated with insert boss 36 and neck surface 49, shown as orientation 22. Comparing FIG. 2 to FIG. 10, display portion 18 is positioned at an angle "B" from second mounting portion 51. Angle "B" of FIG. 10 is larger than angle "A" of FIG. 2, however the same display portion 18 is used in FIG. 2 and FIG. 10. Second mounting portion 51 includes insert boss 55 and neck surface 53 which is formed to give display portion 18 a head tilt position which is different than the head tilt position of FIG. 2, shown as orientation 57. Orientation 22 having angle "A" and orientation 57 having angle "B" are determined by inserts 36 and 55, and neck surfaces 49 and 53 of mounting portions 12 and 51, respectively. In this way, the taxidermist may use the same display portion 18 and select from any number of different mounting portions, shown here as 18 and 51, to achieve the desired head tilt.

As shown in FIGS. 11 and 12, the universal connection of the present invention is not limited to head tilt angle. The entire range of anatomically correct side-to-side animal head movement is also possible by forming a mounting portion with the correct insert and neck surface, shown here as third mounting portion 80 having insert boss 86 and neck surface 99 formed to direct the animal head to the side. Third mounting portion 80 is formed having orientation 82 which positions the animal's head looking to the side of the animal body. This is facilitated by altering neck surface 99 and insert boss 86 to properly connect with recess 35 only when display portion 18 is tilted and turned in the desired head position.

Another of the primary features of the present invention is the body shape and overall look of the mounting portion itself may be altered, while using the same display portion 18. This is facilitated by the universal connection formed by the insert and recess elements of the present invention as discussed previously herein. As shown in FIGS. 1, mounting portion 12 is formed in orientation 22 with the body facing generally symmetrically forward and the neck rising up from the chest area of the animal. As shown in FIG. 11, third mounting portion 80 is formed in orientation 82 with a lowered neck generally level with the animal's chest, and craning to the side. This gives the finished animal model what is known in the art as a "peek" pose, simulating how the animal may be seen in the wild peeking from behind a bush or tree. Thus, orientation 22 and orientation 82, formed from mounting portion 12 and 80, respectively, simulate the animal in different poses for display. The taxidermist may choose orientation 22 or 82 and affix display portion 18 to the respective mounting portion 12 or 80 through use of the universal connection created by insert boss 36 or 86 and recess 35. In this way, the present invention provides a modular taxidermy mannequin which may utilize different mounting portions 12 and 80 to achieve different orientations 22 and 82 of the model animal, while allowing the taxidermist to work on display portion 18 independently of mounting portion 12 and 80.

The universal connection formed by insert boss 36, 55, or 86, and recess 35 as shown in FIGS. 2, 3, and 10-12, is a frictional sliding engagement. However, this connection may be of any style having similar properties, including a mating fashion, a press fit, or a snap fit. Furthermore, friction is not required to hold display portion 18 to mounting portion 12 or 80, glue or other adhesive material may be used enhance the engagement between these two members.

To conclude the taxidermy process, modular taxidermy mannequin 10 is assembled and supporting first and second portion of skin 14 and 20, respectively. Modular taxidermy mannequin 10 is then mounted onto support structure 24. Support structure 24 is shown as a wall-mount, but may be of any kind of mounting structure, including a full animal body supported by animal legs and extending from mounting portion 12, 51, or 80.

The features, display portion, and mounting portion of the present invention may be provided and distributed on an individual basis, or features may be provided in a kit with a corresponding display portion, wherein the features and display portion are generally matched to display a desired or common animal pose.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A method of forming a taxidermy mannequin comprising:
    choosing a first mounting portion, formed generally in the shape of an animal body, from a plurality of mounting portions having different body poses from one another;
    connecting a display portion, formed generally in the shape of an animal head, to the mounting portion;
    supporting a first portion of an animal skin on the selected mounting portion; and
    supporting a second portion of an animal skin on the display portion.

2. The method of forming the taxidermy mannequin of claim 1, the steps after connecting the display portion to the mounting portion comprising:
    securing a simulated eyeball to the display portion adjacent an eye socket; and
    inserting the lip of an artificial nictitating membrane into a groove formed in the eye socket.

3. The method of forming the taxidermy mannequin of claim 1, further comprising the steps of:
    choosing an ear liner from a group of ear liners with different orientations; and
    connecting the chosen ear liner to the display portion.

4. The method of forming the taxidermy mannequin of claim 1, further comprising the steps of:
    choosing a simulated jaw from a group of simulated jaws with different orientations; and
    connecting the chosen simulated jaw to the display portion.

5. The method of forming the taxidermy mannequin of claim 1, further comprising the steps of:
    is choosing a simulated nose from a group of simulated noses with different orientations; and
    connecting the chosen simulated nose to the display portion.

6. A method of forming a taxidermy mannequin comprising the steps of:
    selecting a mounting portion from a first mounting portion having a first orientation and a second mounting portion having a second orientation; and
    connecting a display portion to the selected mounting portion.

7. The method of claim 6, further comprising the step of inserting a portion of the selected mounting portion into the display portion to connect the display portion thereto.

8. The method of claim 6, further comprising the step of inserting a portion of the display portion into the selected mounting portion to connect the display portion thereto.

9. The method of claim 6, further comprising the step of connecting the display portion to the selected mounting portion via a universal connector.

10. The method of claim 6, further comprising the steps of:
    selecting a simulated feature from a simulated nose, a simulated jaw, and an ear liner; and
    connecting the selected simulated feature to the display portion.

* * * * *

UNITED STATES PATENT AND TRADEMARK OFFICE
CERTIFICATE OF CORRECTION

PATENT NO.         : 8,753,126 B2  
APPLICATION NO.    : 13/860866  
DATED              : June 17, 2014  
INVENTOR(S)        : Bryan L. Eppley Page 1 of 1

It is certified that error appears in the above-identified patent and that said Letters Patent is hereby corrected as shown below:

In the Claims:

Column 10, line 6 (Claim 5) remove the word "is"

Signed and Sealed this
Twelfth Day of August, 2014

Michelle K. Lee
*Deputy Director of the United States Patent and Trademark Office*